(12) United States Patent
Ruiz Cortez

(10) Patent No.: US 10,060,775 B2
(45) Date of Patent: Aug. 28, 2018

(54) SMART WATER MANAGEMENT SYSTEM

(71) Applicant: Driblet Labs, LLC, Cambridge, MA (US)

(72) Inventor: Rodolfo Pablo Ruiz Cortez, Newton, MA (US)

(73) Assignee: DRIBLET LABS, LLC, Cambridge, MA (US)

( * ) Notice: Subject to any disclaimer, the term of this patent is extended or adjusted under 35 U.S.C. 154(b) by 440 days.

(21) Appl. No.: 14/643,943

(22) Filed: Mar. 10, 2015

(65) Prior Publication Data

US 2015/0253163 A1 Sep. 10, 2015

Related U.S. Application Data

(60) Provisional application No. 61/950,398, filed on Mar. 10, 2014.

(51) Int. Cl.
*G01F 1/075* (2006.01)
*G01F 15/06* (2006.01)
(Continued)

(52) U.S. Cl.
CPC ............ *G01F 1/075* (2013.01); *G01F 15/024* (2013.01); *G01F 15/063* (2013.01); *H02K 7/1823* (2013.01)

(58) Field of Classification Search
CPC ...... G01F 1/075; G01F 15/063; G01F 15/024; H02K 7/1823
(Continued)

(56) References Cited

U.S. PATENT DOCUMENTS 2,991,652 A 7/1961 Bassett
4,705,060 A 11/1987 Goulbourne
(Continued)

FOREIGN PATENT DOCUMENTS

CN 101441809 A 5/2009
GB 2 445 403 A 7/2008
(Continued)

OTHER PUBLICATIONS

Davies, A., Smart Water Meter Sends You Info via iPad and Smartphone, Treehugger, Feb. 21, 2012, retrieved from the internet at http://www.treehugger.com/clean-technology/smart-water-meters-comes-ipad-app-keep-you-informed.html, 2 pages.
(Continued)

*Primary Examiner* — R. A. Smith
*Assistant Examiner* — John M Royston
(74) *Attorney, Agent, or Firm* — Foley & Lardner LLP

(57) ABSTRACT

A smart water management system fixture device is positioned on a water line. The device includes a measuring unit, an electronics unit, and an energy unit associated with a housing. The measurement unit includes an impeller of a turbine disposed in a water chamber and rotatable therein. The water chamber is positioned between an inlet and an outlet to define a fluid flow path. The measurement unit is in communication with the electronics unit. The electronics unit received information from one or more sensors and harvests electricity using the motion of the turbine and is in communication with an energy unit for story electricity.

12 Claims, 18 Drawing Sheets

(51) Int. Cl.
  *G01F 15/02* (2006.01)
  *H02K 7/18* (2006.01)
(58) Field of Classification Search
  USPC .......................................... 73/861.71–861.94
  See application file for complete search history.

(56) References Cited

U.S. PATENT DOCUMENTS

| | | | |
|---|---|---|---|
| 4,756,030 A | 7/1988 | Juliver | |
| 4,852,802 A | 8/1989 | Iggulden et al. | |
| 4,854,498 A | 8/1989 | Stayton | |
| 4,936,508 A | 6/1990 | Ingalz | |
| 4,940,976 A | 7/1990 | Gastouniotis et al. | |
| 5,086,385 A | 2/1992 | Launey et al. | |
| 5,170,361 A | 12/1992 | Reed | |
| 5,267,587 A | 12/1993 | Brown | |
| 5,721,383 A * | 2/1998 | Franklin | G01F 1/075 |
| | | | 73/861.77 |
| 5,740,031 A | 4/1998 | Gagnon | |
| 5,905,311 A | 5/1999 | Hess et al. | |
| 6,011,334 A | 1/2000 | Roland | |
| 6,038,519 A | 3/2000 | Gauthier et al. | |
| 6,079,280 A * | 6/2000 | Miller | G01F 1/06 |
| | | | 416/223 R |
| 6,283,139 B1 | 9/2001 | Symonds et al. | |
| 6,323,774 B1 | 11/2001 | Mitchell | |
| 6,438,770 B1 | 8/2002 | Hed et al. | |
| 6,509,652 B2 | 1/2003 | Yumita | |
| 6,765,308 B1 | 7/2004 | Kazanjian et al. | |
| 6,768,218 B2 | 7/2004 | Yumita | |
| 6,798,080 B1 | 9/2004 | Baarman et al. | |
| 6,860,288 B2 | 3/2005 | Uhler | |
| 6,885,114 B2 | 4/2005 | Baarman et al. | |
| 6,926,821 B2 | 8/2005 | Giordano et al. | |
| 7,070,396 B2 | 7/2006 | Yamauchi et al. | |
| 7,098,783 B2 | 8/2006 | Crichlow | |
| 7,112,892 B2 | 9/2006 | Mahowald | |
| 7,177,725 B2 | 2/2007 | Nortier et al. | |
| 7,233,078 B2 | 6/2007 | Baarman et al. | |
| 7,253,536 B2 | 8/2007 | Fujimoto et al. | |
| 7,379,997 B2 | 5/2008 | Ehlers et al. | |
| 7,400,944 B2 | 7/2008 | Bailey et al. | |
| 7,471,009 B2 | 12/2008 | Davis et al. | |
| 7,605,485 B2 | 10/2009 | Pitchford et al. | |
| 7,671,480 B2 | 3/2010 | Pitchford et al. | |
| 7,701,076 B2 | 4/2010 | Baarman et al. | |
| 7,712,383 B2 | 5/2010 | Peleg | |
| 7,723,860 B2 | 5/2010 | Nagler | |
| 7,756,590 B2 | 7/2010 | Debourke et al. | |
| 7,768,146 B2 | 8/2010 | Balzano | |
| 7,769,494 B1 | 8/2010 | Simon et al. | |
| 7,783,380 B2 | 8/2010 | York et al. | |
| 7,825,531 B2 | 11/2010 | Tanaka et al. | |
| 7,919,877 B2 | 4/2011 | Shimizu et al. | |
| 7,930,069 B2 | 4/2011 | Savelle et al. | |
| 7,966,099 B2 | 6/2011 | Fima | |
| 8,109,131 B2 | 2/2012 | Winter | |
| 8,162,236 B2 | 4/2012 | Rodenbeck et al. | |
| 8,188,611 B2 | 5/2012 | Farb | |
| 8,279,080 B2 | 10/2012 | Pitchford et al. | |
| 8,347,427 B2 | 1/2013 | Klicpera | |
| 8,438,672 B2 | 5/2013 | Reeder et al. | |
| 8,457,799 B2 | 6/2013 | Cox | |
| 8,560,133 B2 | 10/2013 | Venkatakrishnan et al. | |
| 8,602,384 B2 | 12/2013 | Williamson et al. | |
| 8,606,413 B2 | 12/2013 | Picton | |
| 8,612,061 B2 | 12/2013 | Laflamme et al. | |
| 8,843,241 B2 | 9/2014 | Saberi et al. | |
| 2002/0007510 A1 | 1/2002 | Mann | |
| 2003/0088338 A1 | 5/2003 | Phillips et al. | |
| 2004/0206405 A1 | 10/2004 | Smith et al. | |
| 2006/0129356 A1 | 6/2006 | Nakamoto et al. | |
| 2006/0186215 A1 | 8/2006 | Logan | |
| 2010/0181771 A1 | 7/2010 | Roos | |
| 2010/0230969 A1 | 9/2010 | Peleg | |
| 2010/0308587 A1 | 12/2010 | Tu et al. | |
| 2011/0030482 A1 | 2/2011 | Meeusen et al. | |
| 2011/0071698 A1 | 3/2011 | Glasser et al. | |
| 2011/0074157 A1 | 3/2011 | Kuroishi et al. | |
| 2011/0114202 A1 | 5/2011 | Goseco | |
| 2011/0203364 A1 * | 8/2011 | Staake | F24D 19/1063 |
| | | | 73/198 |
| 2011/0289675 A1 | 12/2011 | Dunki-Jacobs et al. | |
| 2011/0300826 A1 | 12/2011 | Chang et al. | |
| 2012/0053739 A1 | 3/2012 | Brian et al. | |
| 2012/0255116 A1 | 10/2012 | Houghton | |
| 2012/0284124 A1 | 11/2012 | Harangozo et al. | |
| 2012/0291886 A1 | 11/2012 | Rivera | |
| 2012/0305113 A1 * | 12/2012 | Williamson | G01F 25/00 |
| | | | 137/561 R |
| 2012/0310800 A1 | 12/2012 | Xia et al. | |
| 2013/0002447 A1 | 1/2013 | Vogel et al. | |
| 2013/0009788 A1 | 1/2013 | Langenberg et al. | |
| 2013/0080081 A1 * | 3/2013 | Dugger | G01F 1/667 |
| | | | 702/48 |
| 2013/0116941 A1 * | 5/2013 | Lie-Nielsen | G01F 15/066 |
| | | | 702/46 |
| 2013/0207815 A1 | 8/2013 | Pitchford et al. | |
| 2013/0340833 A1 | 12/2013 | Alonazy | |

FOREIGN PATENT DOCUMENTS

| | | |
|---|---|---|
| JP | 2000-074709 A | 3/2000 |
| JP | 2007-316040 A | 12/2007 |
| WO | WO-2009/147691 | 12/2009 |

OTHER PUBLICATIONS

Mencarelli et al., Self-Powered Sensor Networks for Water Grids: Challenges and Preliminary Evaluations, Journal of Selected Areas in Telecommunications, Oct. 2012, 8 pages.

* cited by examiner

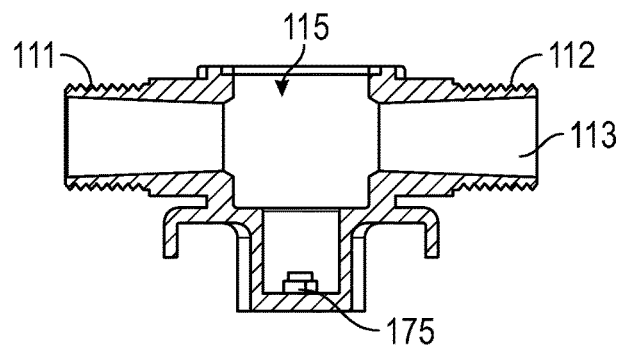
FIG. 12
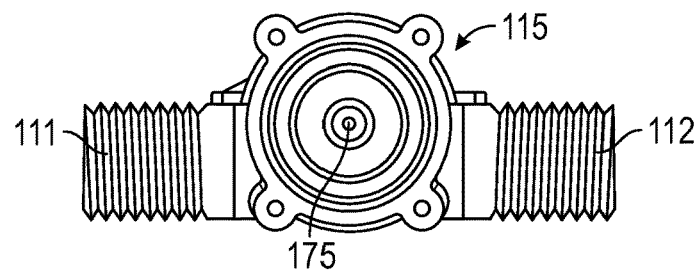
FIG. 13
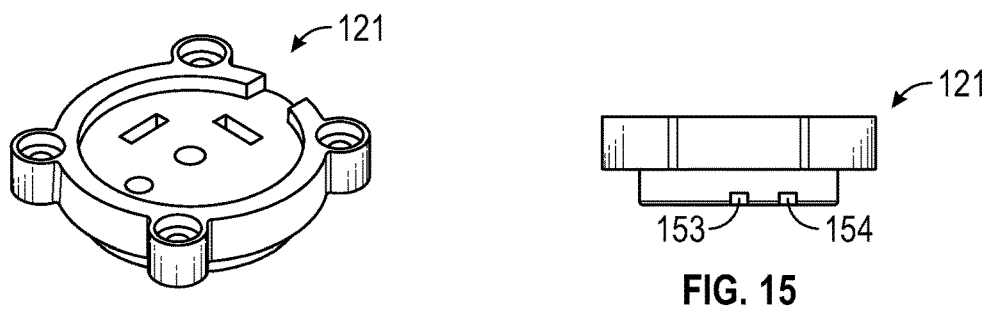
FIG. 14
FIG. 15
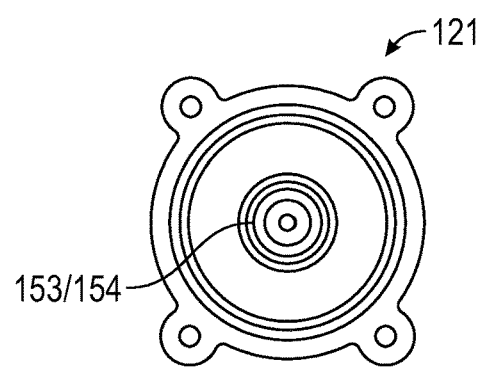
FIG. 16

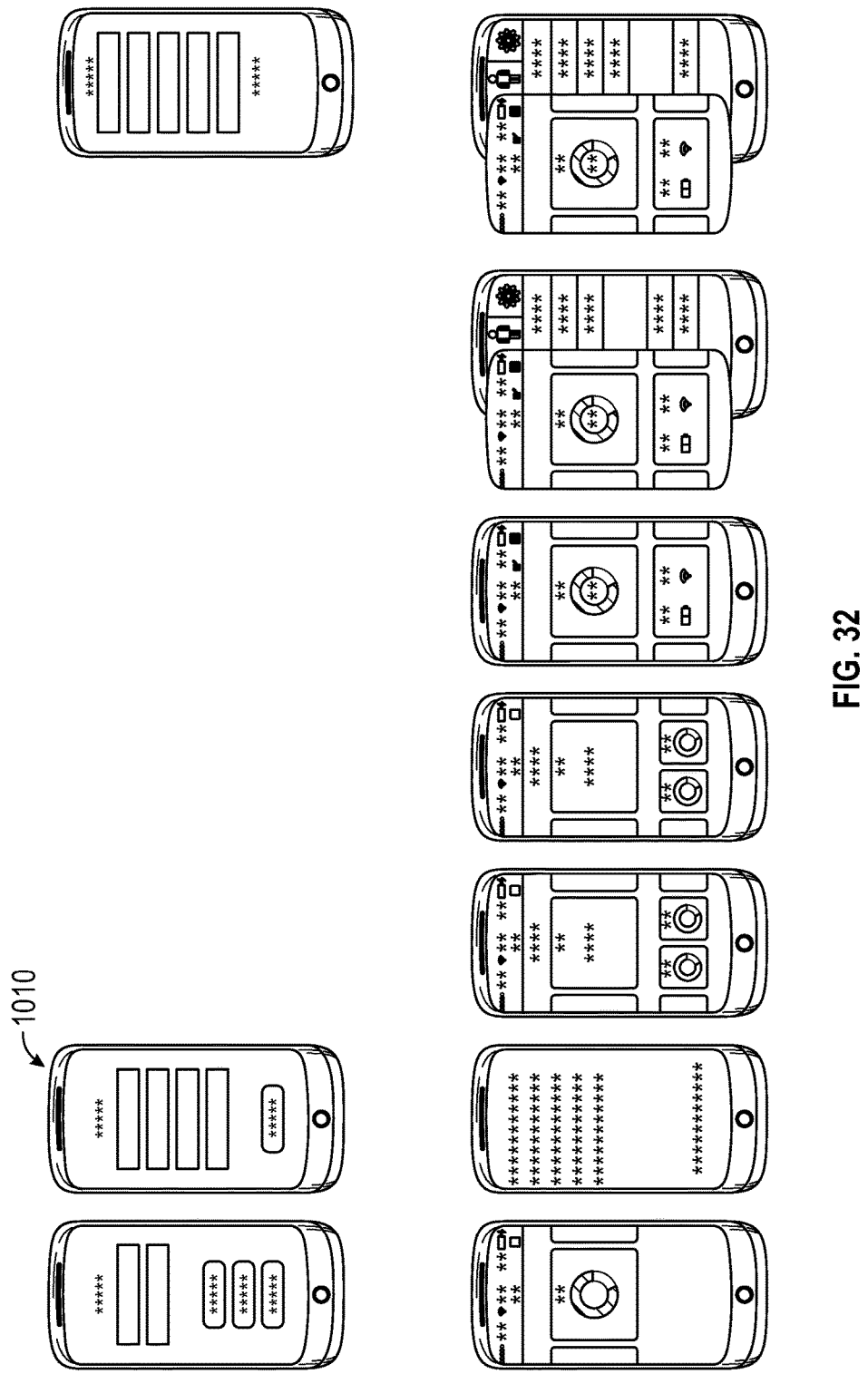

< CIC 14th Floor     DRIBLET #1     John Doe

DRIBLET INFO

WATER CONSUMPTION
2%

Driblet
Driblet #1 ☑
Location:
Kitchen (Faucet) ☐

DATA   STATUS   GOALS

DRIBLET DATA

********

| USER TREND | MTD VARIANCE (#) | MTD VARIANCE (GAL) |
|---|---|---|
| 13.0% | $52.00 | 26.00 GAL |
| Increase from January | Increase from January | Increase from January |

DRIBLET     HOME   ABOUT   HELP   CONTACT

FIG. 35

< MA Offices | CIC 14TH FLOOR | John Doe

GROUP INFO

WATER CONSUMPTION 2%

Group Narrow
CIC 14th Floor ☑
Location:

DATA DRIBLETS GOALS SETTINGS

DRIBLETS(#)

DRIBLET #1
2%

ADD NEW DRIBLET

DRIBLET | HOME ABOUT HELP CONTACT

FIG. 36

SMART WATER MANAGEMENT SYSTEM

CROSS REFERENCE TO RELATED APPLICATIONS

This application claims priority U.S. Provisional Patent Application Ser. No. 61/950,398, filed Mar. 10, 2014, which is incorporated herein by reference.

FIELD

The present inventions relate to the field of water consumption and management. The present inventions more specifically relate to the field of smart devices for water management and systems therefore.

BACKGROUND

Sustainability of current and future water resource allocation is a growing concern to the public. Finding a balance between what is needed by humans and what is needed in the environment is an important step in the sustainability of water resources. In addition, water usage and water properties have a significant impact on costs incurred by residential consumers and businesses. As a result new management strategies are needed.

Some businesses and consumers attempt to implement water-efficiency best management practices to help understand and better manage their water use. Actively monitoring water use and effectively educating individuals about facility water use and water management planning goals are key components of properly managing and reducing commercial facility and residential water use. Monitoring and education set the stage for the relative success of a water management program, providing the ability to track and measure progress to increase awareness and build support for specific projects or user behavior changes.

Attempts have been made to accomplish these goals through various devices, but each suffers from various drawbacks. For example, some existing commercial systems used to monitor or control water usage involve a complex network of water lines, cords, and cables that require a skilled technician to install, maintain, and in some instances use. As a result, such systems are often not properly used or effectively used and are not widely adopted.

Other examples include large industrial devices designed for use by municipal utilities. Unfortunately, such devices cannot measure water at the fixture level (e.g., at the faucet), and due to large size are not versatile or useable by commercial and residential water users.

Smaller examples of water flow monitoring devices include devices which include a display directly on the device attached to the water line, requiring the individual user to obtain data from the display and manually record the data for further use. Alternative examples include devices that are attachable in limited locations, such as to a shower, and only provide an estimate of the volume of water. Unfortunately, these systems have limited accuracy and are not user friendly.

Accordingly, what is needed is a smart water management system which is small and versatile so as to permit management of water consumption at the fixture level, but also capable of being scaled to commercial uses. What is also needed is a smart water management system which communicates with a user to provide real time information and allow the user to monitor and control water usage.

SUMMARY

Accordingly, a smart water management system and device are disclosed. The smart water management system includes a fixture device and a computer system which are electronically coupled or in communication to track water consumption and properties to allow monitoring and control of water.

The smart water management system described is small and versatile so as to permit management of water consumption at the fixture level, but is also capable of being scaled to commercial uses. The smart water management system includes a communication system which communicates with a user to provide real time information as well as data storage and reporting, allowing the user to effectively monitor and control water usage.

BRIEF DESCRIPTION OF DRAWINGS

Various examples of embodiments of the systems, devices, and methods according to this invention will be described in detail, with reference to the following figures, wherein:

FIG. 12 is a cross-sectional view of the water chamber of FIG. 11, taken from line A-A of FIG. 11.

FIG. 13 is an elevation view of the water chamber of FIG. 10 for use with the fixture device of FIG. 2.

FIG. 14 is a perspective view of a cover for use with the fixture device of FIG. 2.

FIG. 15 is an elevation view of the cover of FIG. 14 for use with the fixture device of FIG. 2.

FIG. 16 is an elevation view of the cover of FIG. 14 for use with the fixture device of FIG. 2.

FIG. 32 is a flow diagram illustrating one or more screen shots of a software application for use with a computing system in association with the smart water management system shown in FIG. 1, showing examples of a login screen, a menu for selection of different functions, and an assistant screen.

FIG. 35 is a flow diagram illustrating one or more screen shots of a software application for use with a computing system in association with the smart water management system shown in FIG. 1, showing examples of goals and alert setting screens.

FIG. 36 illustrates one or more screen shots of a software application for use with a computing system in association with the smart water management system shown in FIG. 1, showing examples of a wireless communication linking, and a data report on comparing multiple water management systems.

Figure 1:
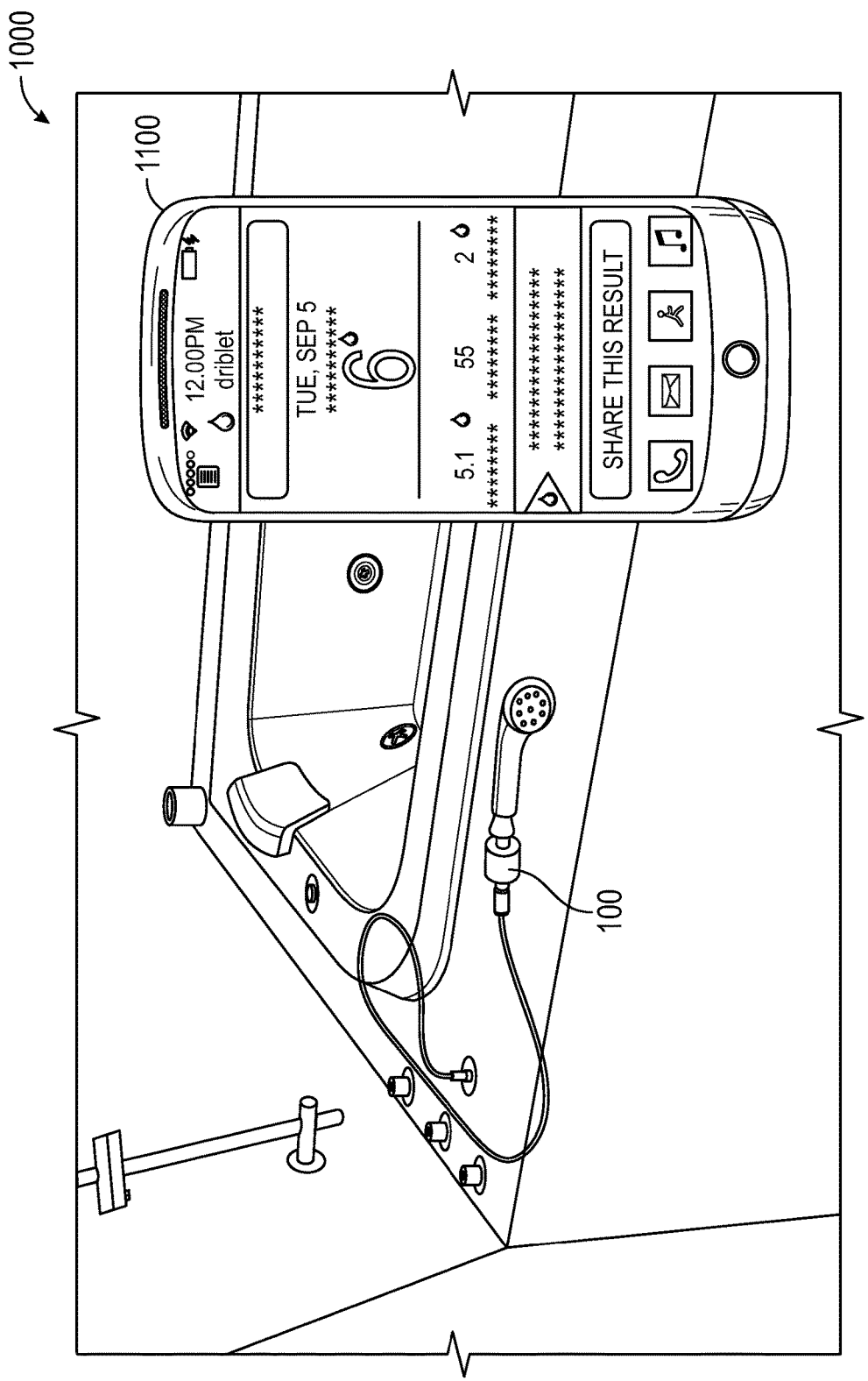
FIG. 1 illustrates one or more examples of embodiments of a smart water management system, showing a fixture device on a fixture and a computing application linked thereto.
Figure 2:
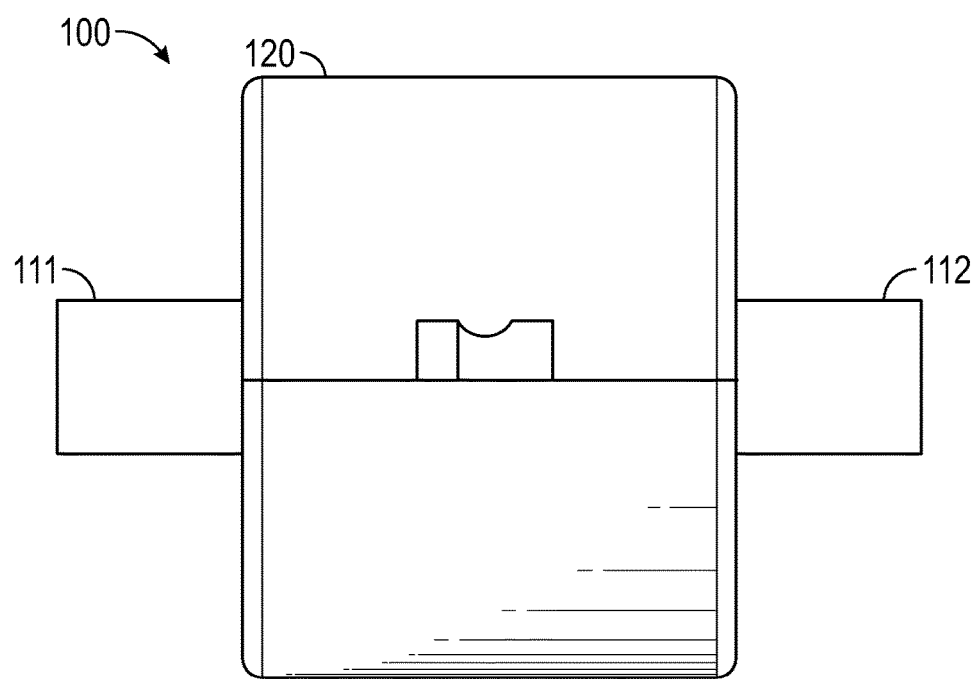
FIG. 2 is a perspective view of a fixture device for use with the smart water management system shown in FIG. 1.
Figure 3:
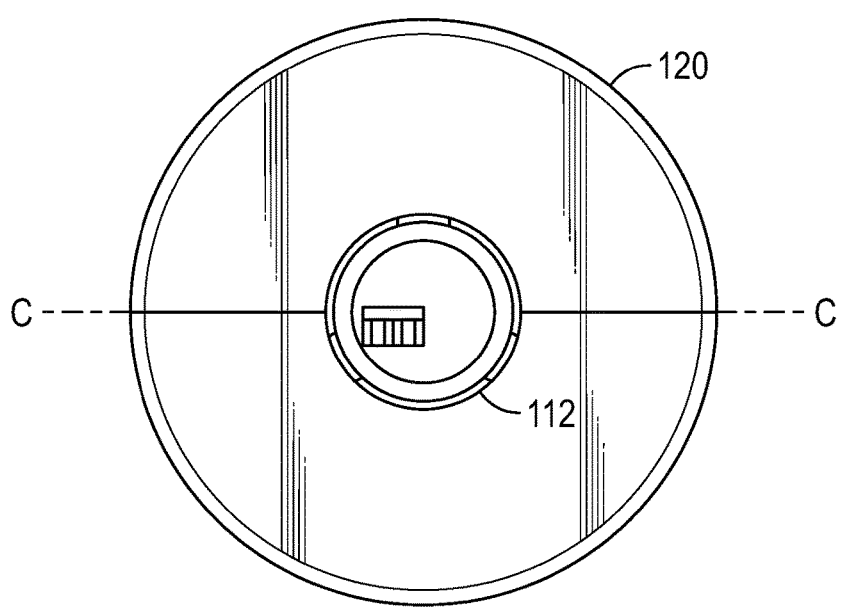
FIG. 3 is an elevation view of the fixture device of FIG. 2 for use with the smart water management system shown in FIG. 1.
Figure 4:
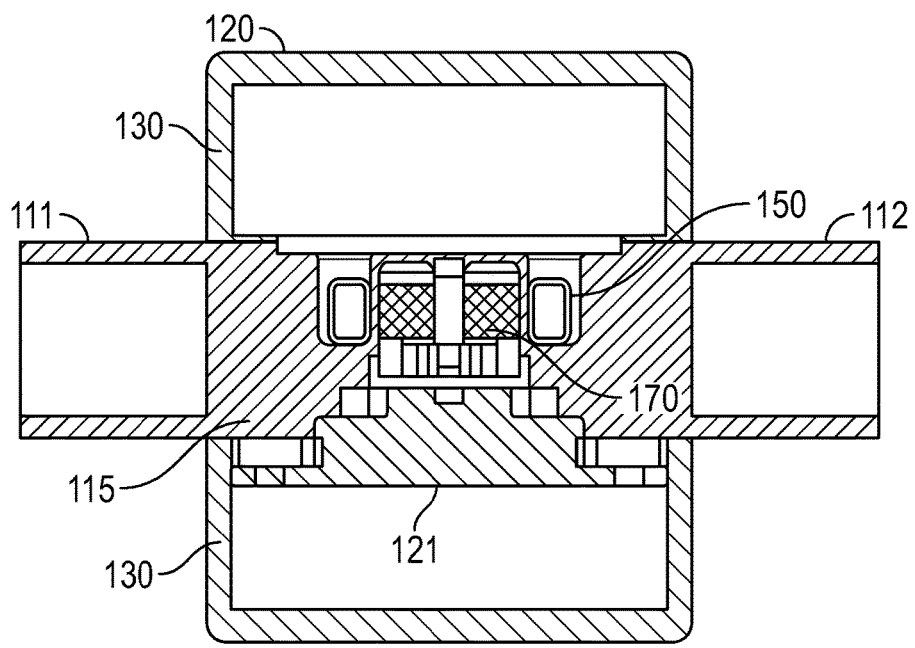
FIG. 4 is a cross-sectional view of the fixture device of FIG. 2 for use with the smart water management system shown in FIG. 1.
Figure 5:
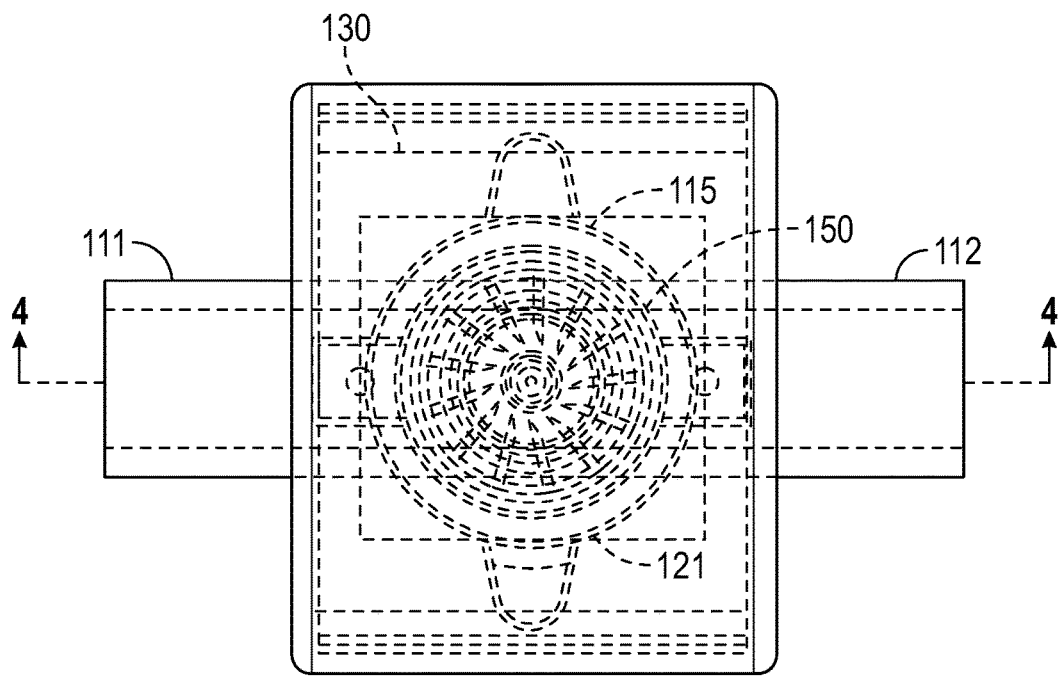
FIG. 5 is a cross sectional view of the fixture device of FIG. 2 for use with the smart water management system shown in FIG. 1.
Figure 6:
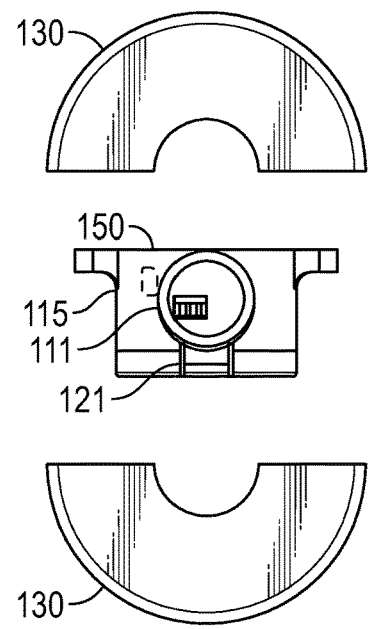
FIG. 6 is an exploded view of the fixture device of FIG. 2 for use with the smart water management system shown in FIG. 1.
Figure 7:
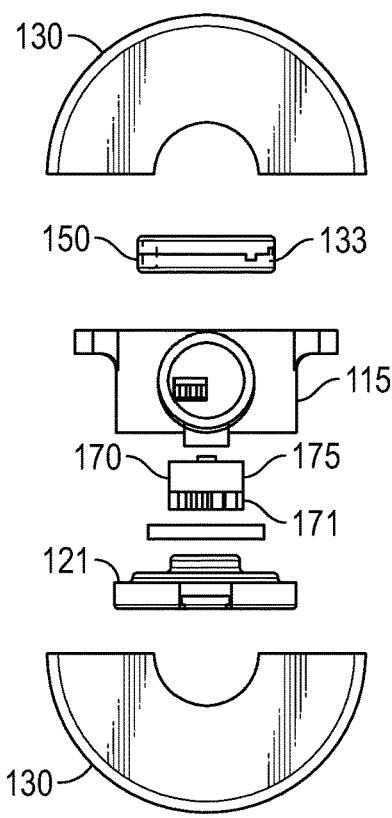
FIG. 7 is an exploded view of the fixture device of FIG. 2 for use with the smart water management system shown in FIG. 1.
Figure 8:
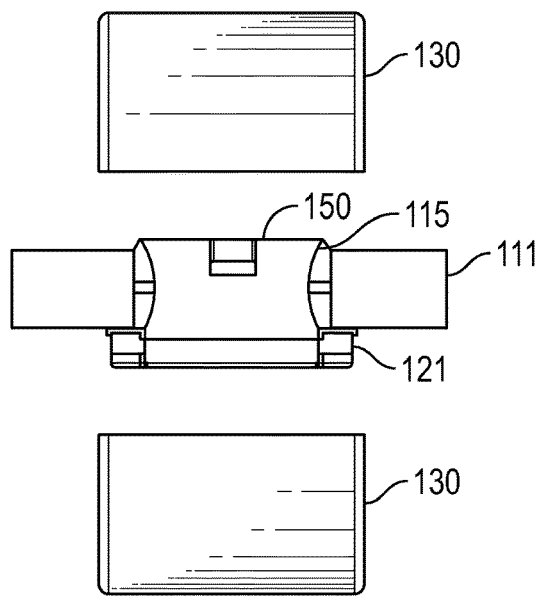
FIG. 8 is an exploded view of the fixture device of FIG. 2 for use with the smart water management system shown in FIG. 1
Figure 9:
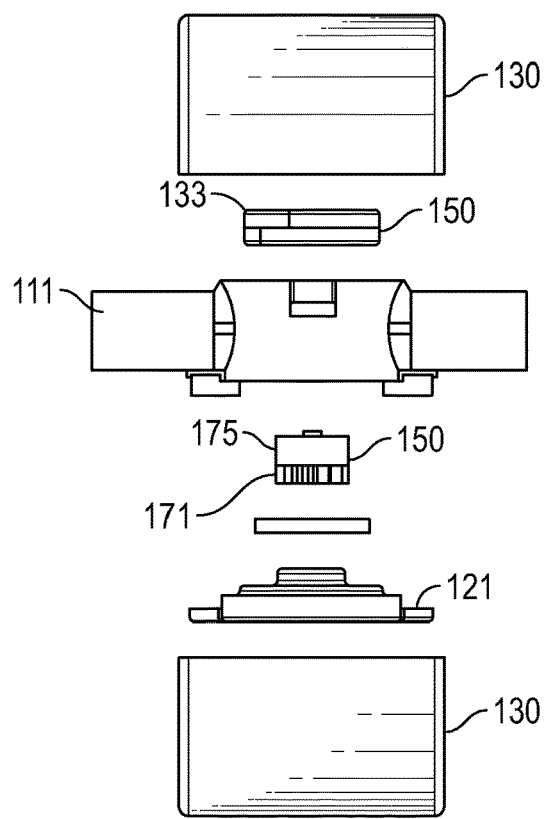
FIG. 9 is an exploded view of the fixture device of FIG. 2 for use with the smart water management system shown in FIG. 1, taken from line A-A of FIG. 8.
Figure 10:
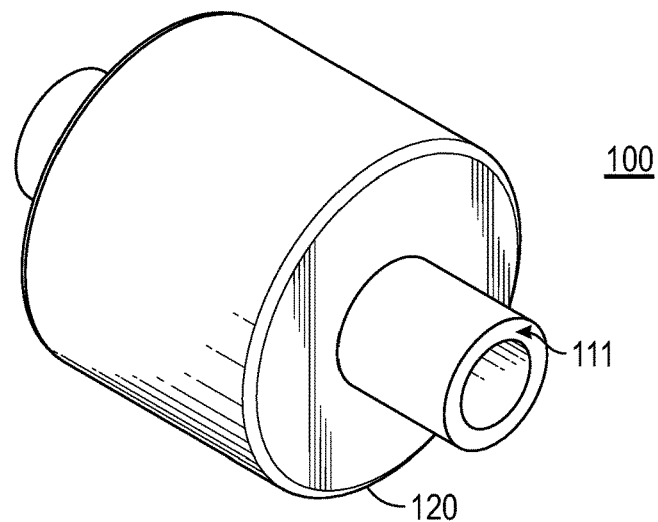
FIG. 10 is a perspective view of a water chamber for use with the fixture device of FIG. 2.
Figure 11:
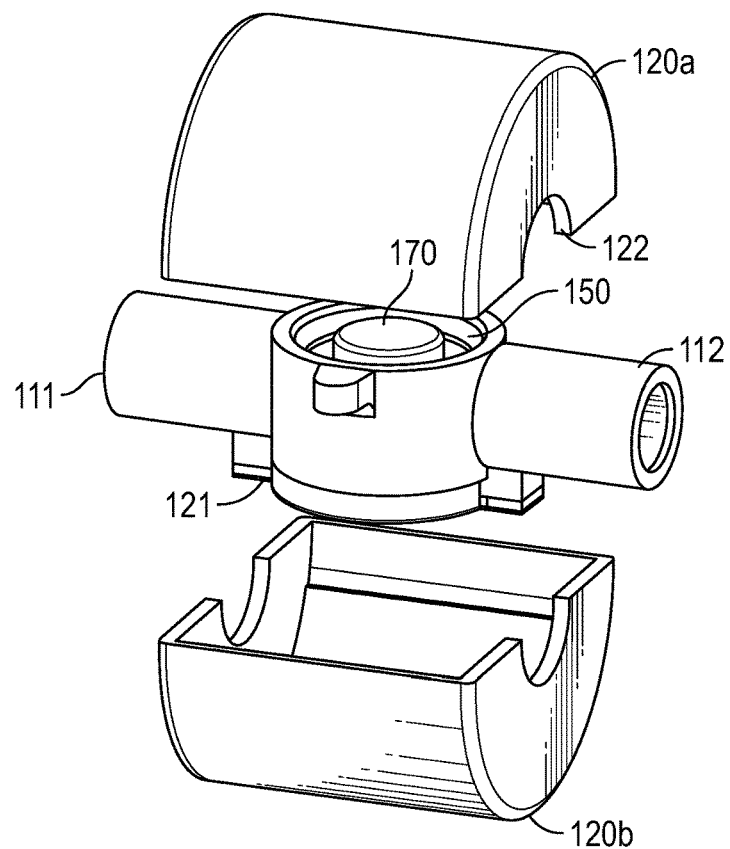
FIG. 11 is an exploded view of the water chamber of FIG. 10 for use with the fixture device of FIG. 2.
Figure 19:
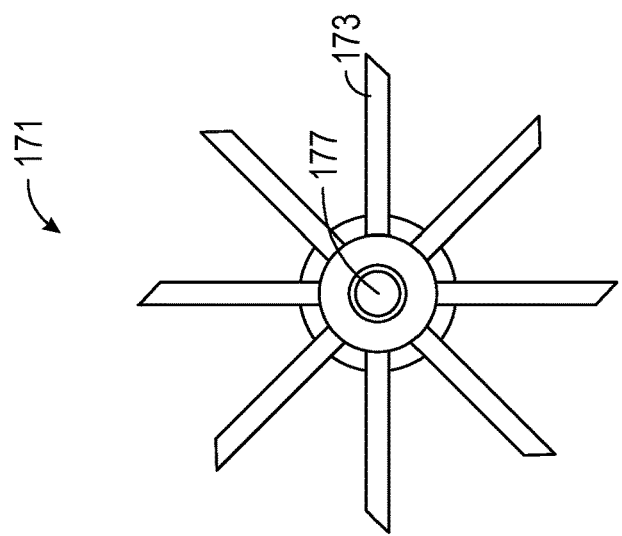
FIG. 19 is an elevation view of the impeller of FIG. 17 for use with the fixture device of FIG. 2.
Figure 18:
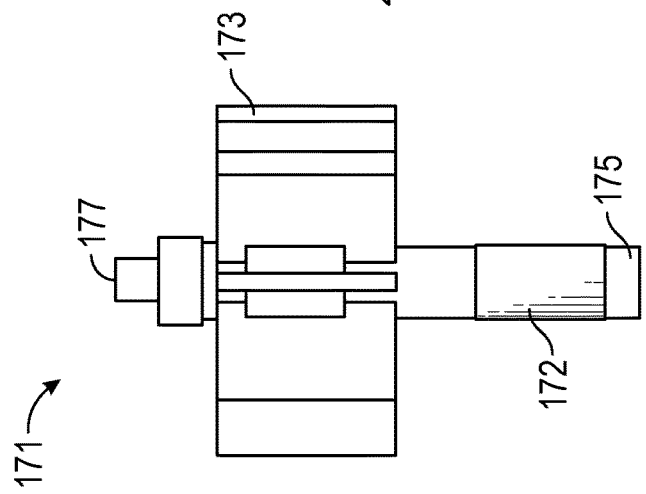
FIG. 18 is an elevation view of the impeller of FIG. 17 for use with the fixture device of FIG. 2.
Figure 17:
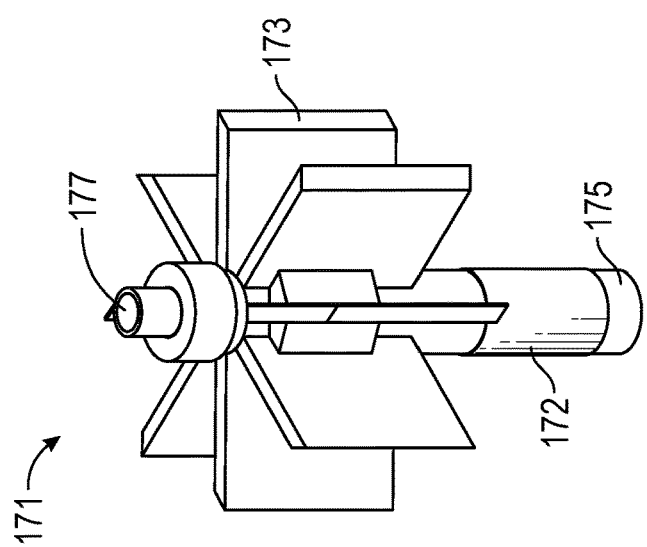
FIG. 17 is a perspective view of an impeller for use with the fixture device of FIG. 2.
Figure 20:
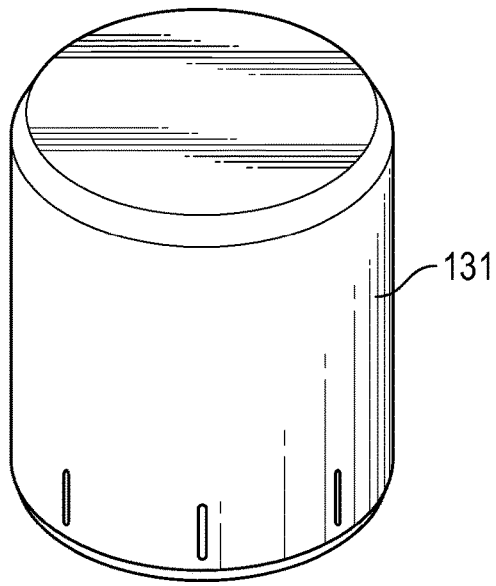
FIG. 20 is a perspective view of an electrical unit cover for use with the fixture device of FIG. 2.
Figure 21:
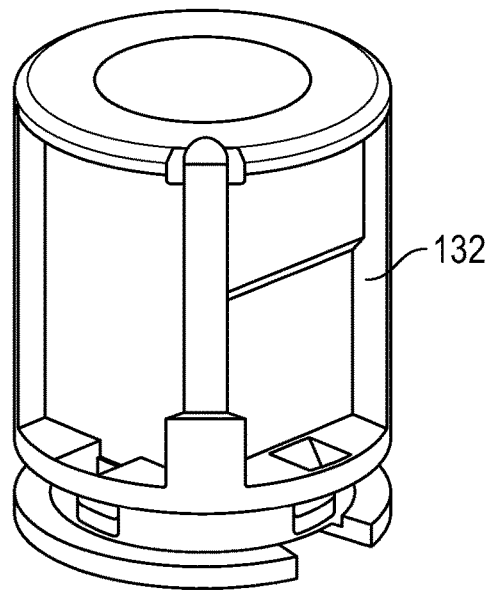
FIG. 21 is a perspective view of an electrical cage for use with the fixture device of FIG. 2.
Figure 22:
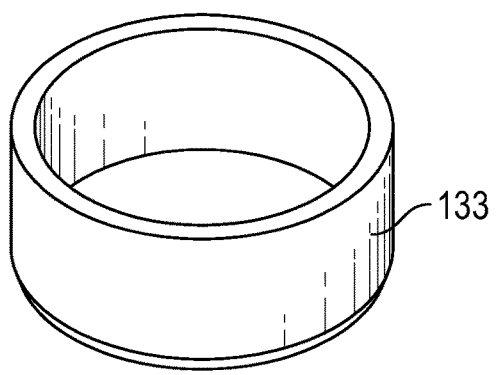
FIG. 22 is a perspective view of a cradle magnet for use with the fixture device of FIG. 2
Figure 23:
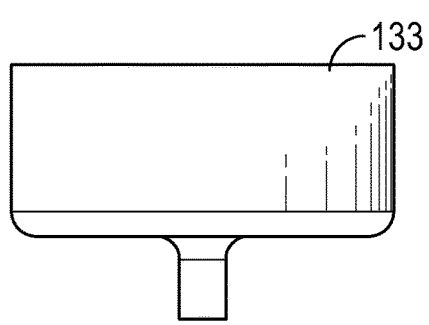
FIG. 23 is an elevation view of the cradle magnet of FIG. 22 for use with the fixture device of FIG. 2.
Figure 24:
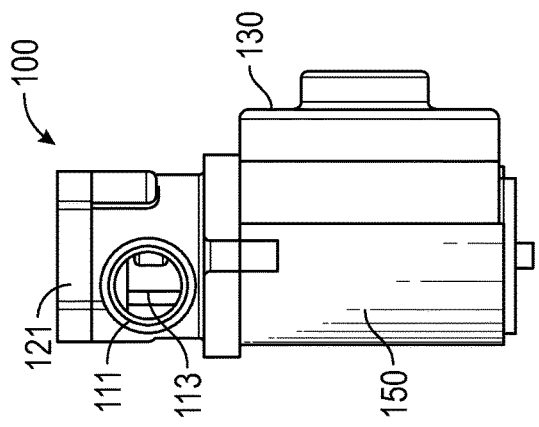
FIG. 24 is an elevation view of an alternative example of embodiments of a fixture device for use with the smart water management system shown in FIG. 1.
Figure 25:
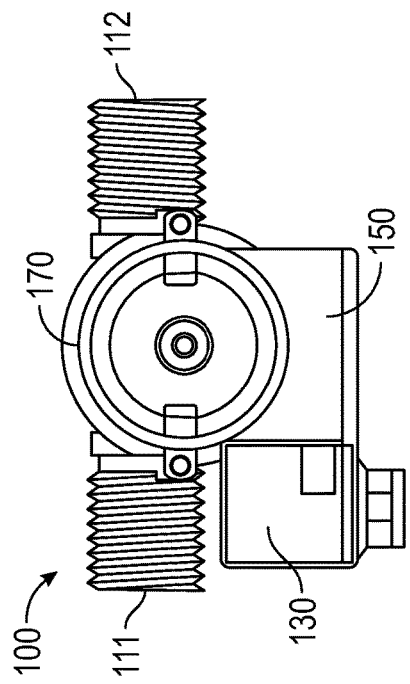
FIG. 25 is an elevation view of the fixture device of FIG. 24 for use with the smart water management system shown in FIG. 1.
Figure 26:
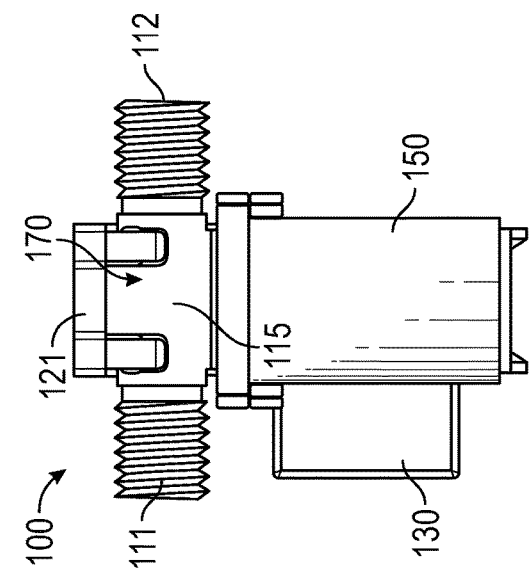
FIG. 26 is an elevation view of the fixture device of FIG. 24 for use with the smart water management system shown in FIG. 1.
Figure 27:
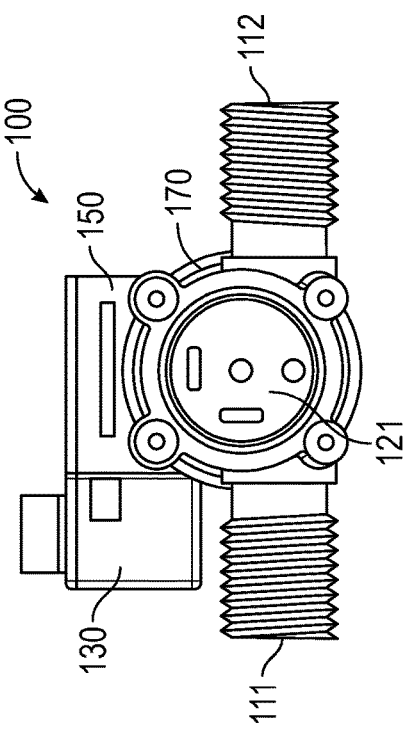
FIG. 27 is an elevation view of the fixture device of FIG. 24 for use with the smart water management system shown in FIG. 1.
Figure 28:
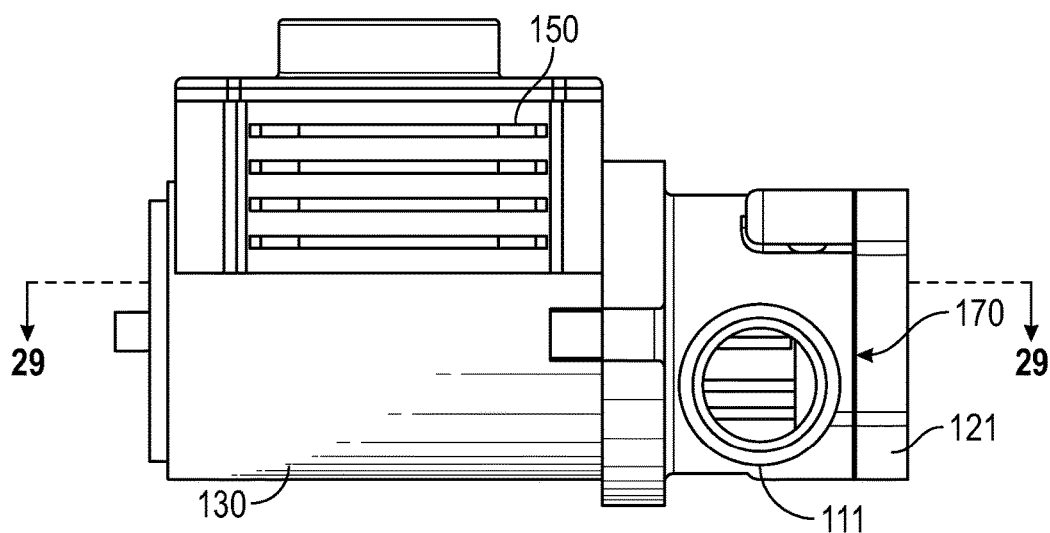
FIG. 28 is an elevation view of the fixture device of FIG. 24 for use with the smart water management system shown in FIG. 1.
Figure 29:
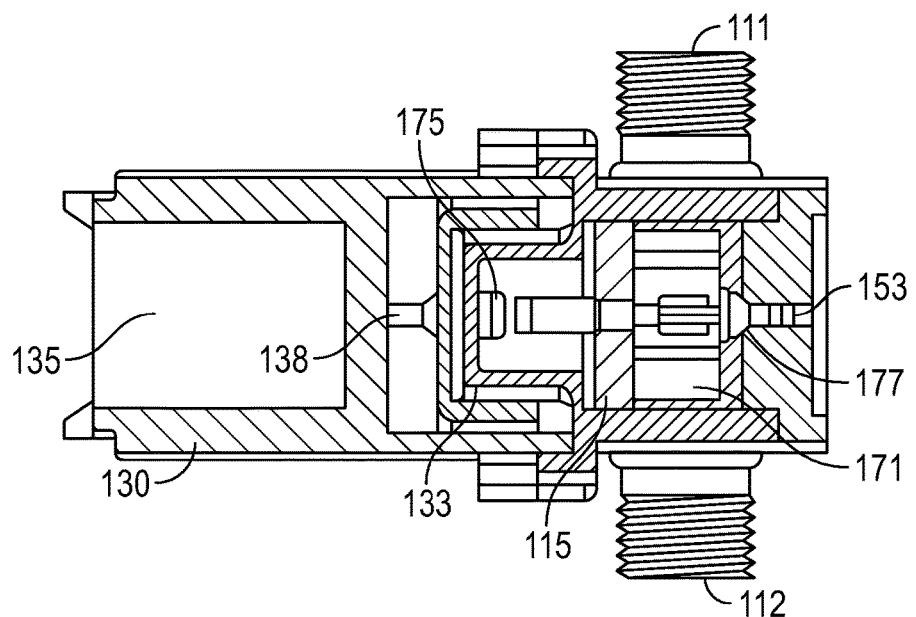
FIG. 29 is a cross-sectional view of the fixture device of FIG. 24 for use with the smart water management system shown in FIG. 1, taken from line C-C of FIG. 28.
Figure 31:
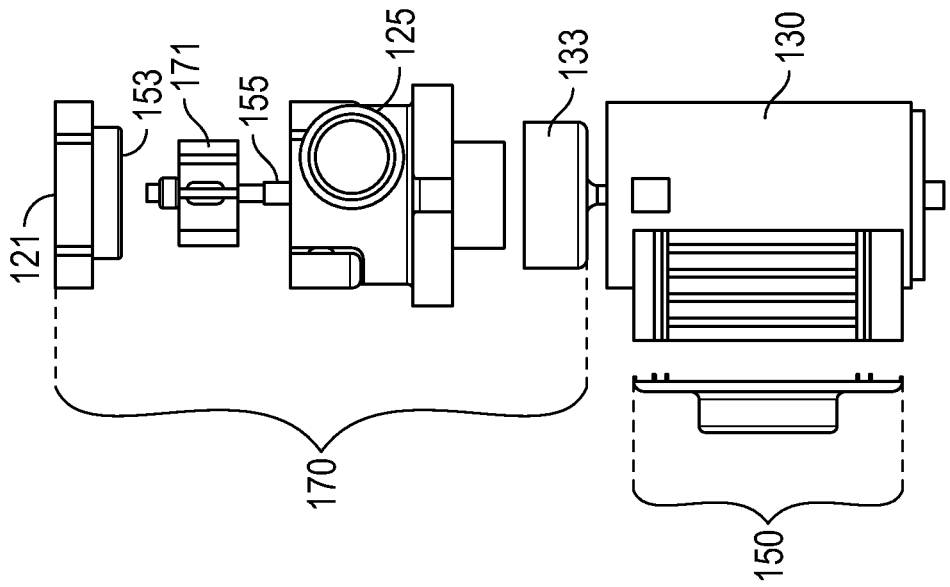
FIG. 31 is an exploded view of the fixture device of FIG. 24 for use with the smart water management system shown in FIG. 1, showing the view illustrated by FIG. 28.
Figure 30:
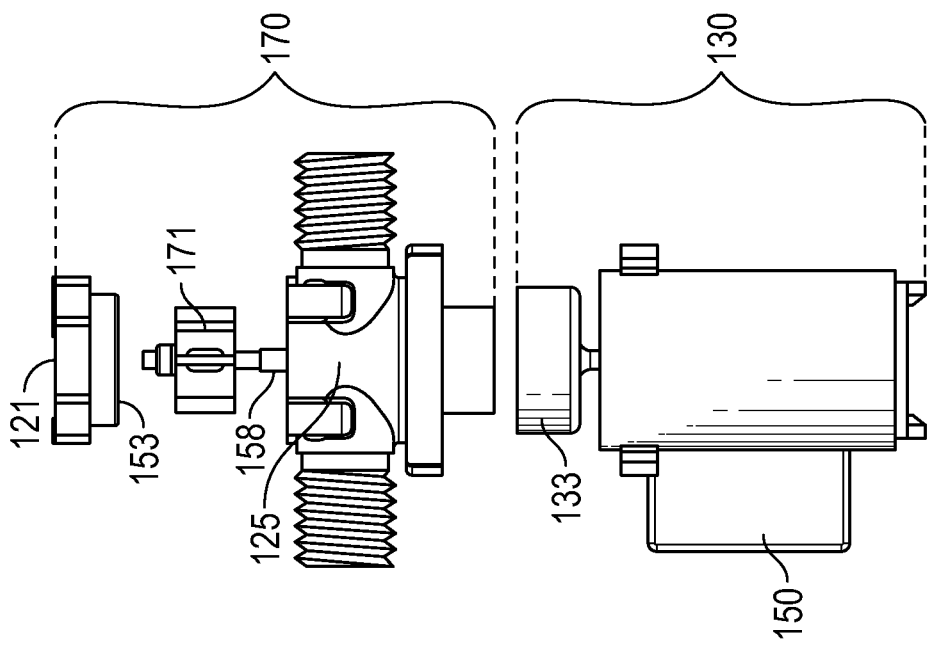
FIG. 30 is an exploded view of the fixture device of FIG. 24 for use with the smart water management system shown in FIG. 1, showing the view illustrated by FIG. 24.
Figure 33:
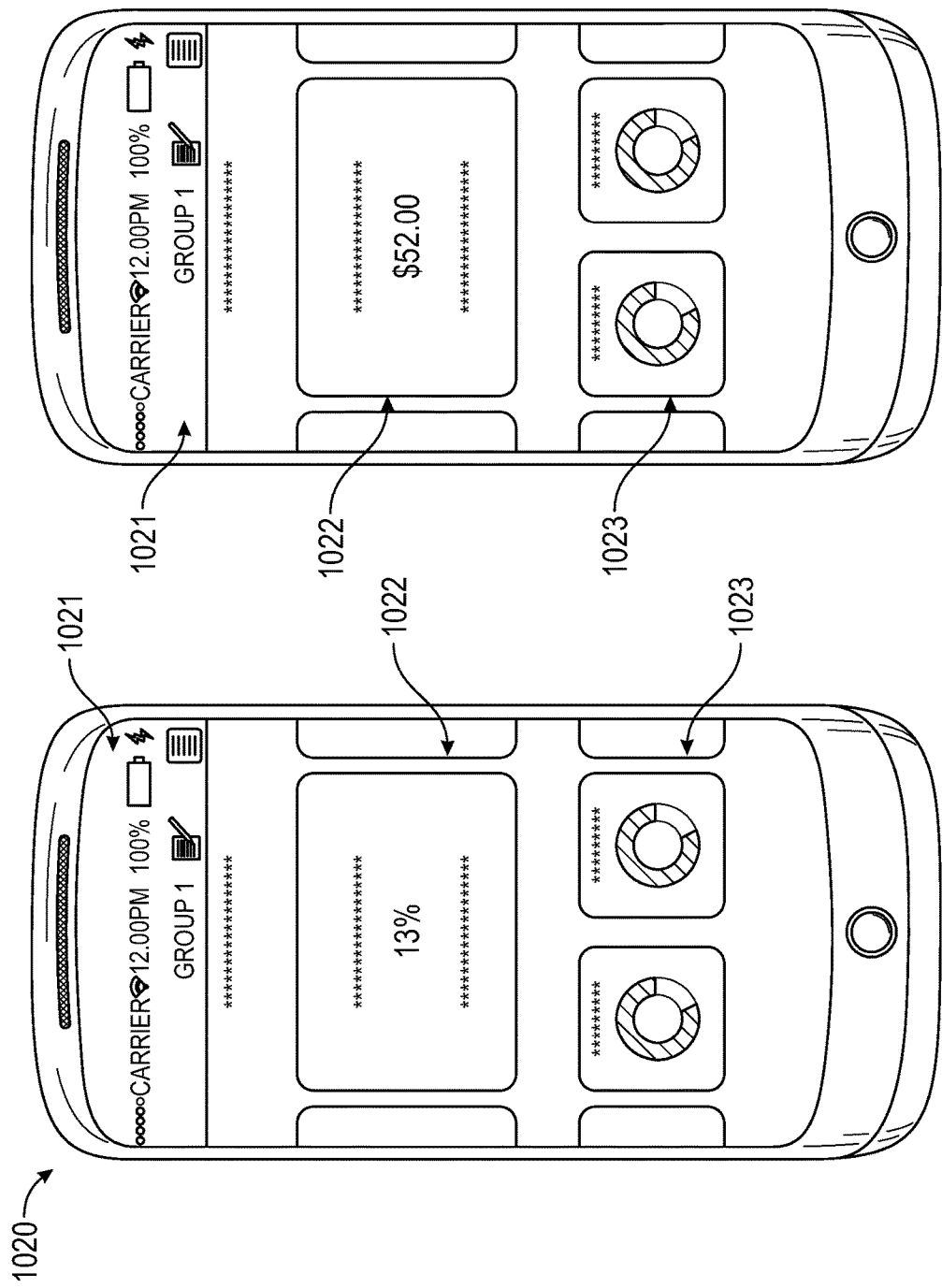
FIG. 33 is a screen shot of one or more examples of a software application for use with a computing system in association with the smart water management system shown in FIG. 1, showing examples of a monitoring screen and a menu for selection of different functions.
Figure 34:
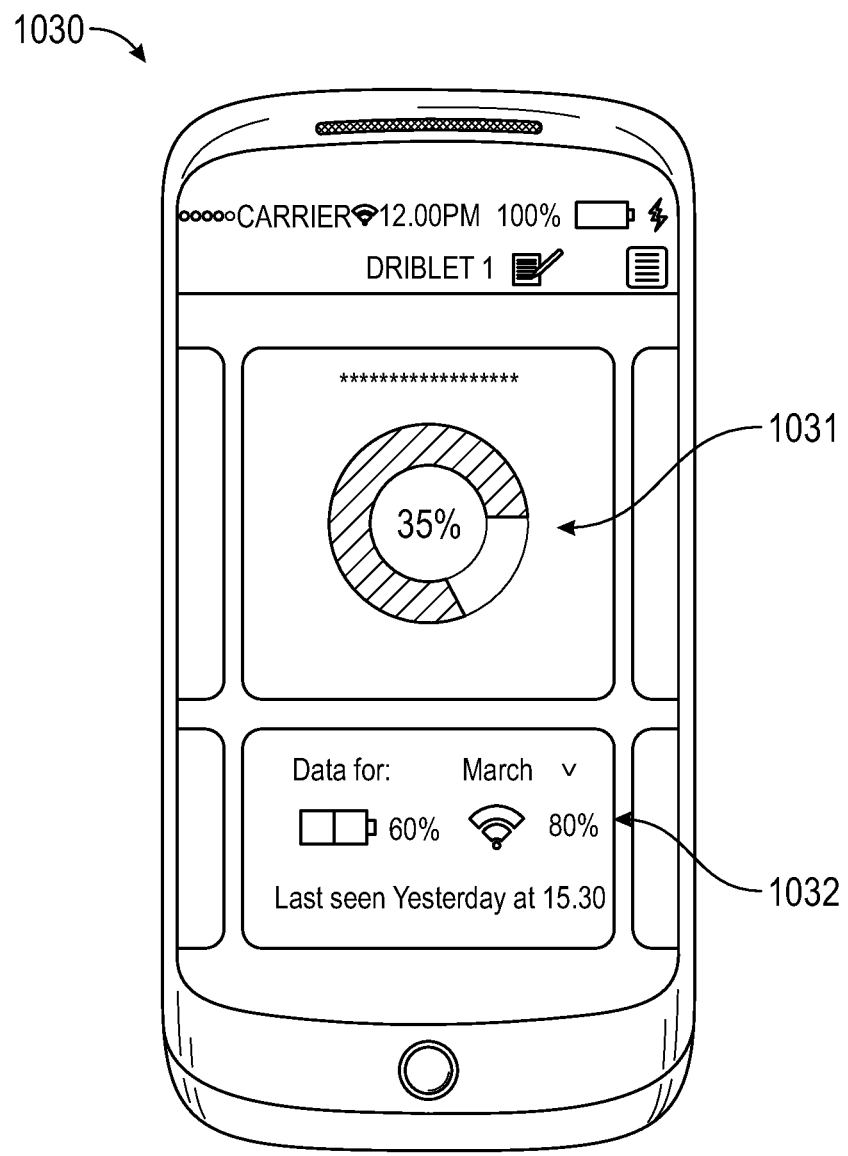
FIG. 34 is a flow diagram illustrating one or more screen shots of a software application for use with a computing system in association with the smart water management system shown in FIG. 1, showing examples of monitoring screens, a graphic representation of data collected by the system, and a social media connection.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Referring to the Figures, a smart water management system 1000 and device 100 are illustrated and described. The smart water management system 1000 according to one or more examples of embodiments includes a fixture device 100 and computer system 1100 which are electronically coupled, or are in communication, to track water consumption and properties to allow monitoring and control of water. In one or more particular examples of embodiments, the system is embodied in a smart wireless device and a mobile application that track water consumption volumes and trigger or encourage or control actions. An example of a smart water management system is illustrated and disclosed in Applicant's prior filed U.S. Provisional Patent Application Ser. No. 61/873,837, the entire contents of which is hereby incorporated herein by reference.

The smart water management system fixture device 100 generally includes a measurement unit 170, an energy unit 150, and an electronics unit 130. While the fixture device herein is specifically described in reference to "water," it is understood that the principals and embodiments described herein may be adapted to other fluids and fluid transmission without departing from the overall scope of the present invention. The fixture device is formed by a housing 120 which carries the respective components of the device. The housing 120 may further be subdivided into one or more units, components, or chambers for housing 120 various components of the fixture device. In one embodiment, the energy unit 150 and measurement unit 170 comprises a turbine system for harnessing the flow of water to rotate an impeller 171 to generate electricity, such as described in U.S. Ser. No. 13/999,219, incorporated herein by reference.

The measurement unit 170 is provided in association with a water chamber 125. The water chamber 125, as can be seen in the illustrated examples of embodiments, has one or more fittings 111, 112 or couplings joined to the housing 120. The fittings 111, 112 or couplings are adapted to join to a mating pipe or fitting 111, 112 or coupling in a structure, such as a building, or on a hose or other fluid transmission line. As shown in the illustrated embodiment, two fittings 111, 112 are attached to the housing 120 near the water chamber 125 and provide a flow-through aperture into an interior of the chamber. As can be seen by reference to the Figures, a pair of fittings 111, 112 with flow-through apertures is provided, thereby providing inlet and exit or outlet openings for the water chamber 125. In the illustrated example, the inlet and outlet openings and fittings 111, 112 are aligned in an approximately linear flow path 13, although variations thereon may be acceptable for the purposes provided. Likewise, it is contemplated that one fitting or more than two fittings 111, 112 arranged to accomplish the purposes described herein may also be acceptable. The fitting(s) may be threaded, either internally or externally, to permit connection to a transmission line or pipe. In the illustrated examples, the fitting is a male connector which may join to a corresponding female connector. While specific examples are illustrated and described, it is understood that now known or future developed couplings or fittings 111, 112 may be substituted in place of the examples illustrated herein without departing from the overall scope of the present invention. As indicated, the water chamber 125 has an interior chamber with a volume sufficient to hold an amount of water and the components further described herein. The interior chamber is in fluid communication with the couplings or fittings 111, 112 and accordingly has apertures therein.

The housing 120 may also have a cap or cover 121, and in one or more examples of embodiments, a removable cover 121 which is coupled to the housing 120. The cover 121 may be coupled to the housing 120 by any suitable means. In the illustrated examples, the cover 121 has one or more fastening devices which join the cover 121 to the housing 120 in proximity to the water chamber 125. In one or more alternative examples of embodiments, the cover 121 may be threaded and mate with a corresponding thread on an interior surface of the housing 120. The interior chamber of the water chamber 125 accordingly further includes an opening or is otherwise accessible to one or more components carried by the cover 121. The cover 121 may carry or include one or more sensors or measurement devices. In one example of embodiments, a sensor for monitoring water flow and/or a sensor for monitoring temperature may be provided. For example, the cover 121 may carry a coil 133 and magnet 175 pair generating a frequency directly associated with water flow velocity working as a sensor and/or a temperature sensor. A sensor may also be provided for monitoring water quality. It is contemplated that one or more sensors may be carried or housed elsewhere in the housing 120.

Carried within the water chamber 125 of the measurement unit 170 is an impeller 171 associated with a turbine system. In one or more examples of embodiments, the impeller 171 has a plurality of blades 173 extending outward from a central axle. The axle may be secured and rotatable in position in a portion of the housing 120 and/or cover 121. Preferably, the impeller 171 is positioned to rotate about an axis centered on the axle in response to the flow of fluid or water into and through the water chamber 125. In the illustrated embodiment, the blades 173 are positioned so as to be in the path 13 of the fluid flowing through the water chamber 125. Accordingly, the impeller blades 173 in the illustrated example are seated approximately between the inlet and outlet openings and couplings of the chamber. The axle is further positioned perpendicular to the direction of flow in the illustrated example, such that the water flowing into the water chamber 125 may apply a force to the blades 173 and rotate the impeller 171 about the axis.

In one embodiment, joined to the impeller 171 is a magnet 175, or a plurality of magnets. In particular, a magnet, or a first impeller magnet 175 is joined to the axle of the impeller 171 on a first side of the impeller 171. A magnet, or a second impeller magnet 177, may also be joined to the axle of the impeller 171 on a second side of the impeller 171, namely, proximate to the cover 121. The magnet(s) described may be a single magnet joined to a portion of the axle, a magnet that surrounds or substantially surrounds the axle, and/or a plurality of magnets joined to the axle. The first magnet is arranged to interact or communicate with and drive the energy unit 150. The second magnet is arranged to sense the amount or volume of water that has flown through the smart water fixture device.

More specifically, the first impeller magnet 175 is provided with a polarity. The first impeller magnet 175 in position in the measurement unit 170 is placed in proximity to a magnet coupled to an alternator motor. The alternator magnet has a polarity which is either the same or opposite of the polarity of the first impeller magnet 175. As a result, the movement of the first impeller magnet 175 may impart movement to the alternator magnet. Preferably, the alternator magnet is positioned and secured on a shaft or axle 138 of the alternator motor. The magnet(s) described may be a single magnet joined to a portion of the axle, a magnet that surrounds or substantially surrounds the axle, and/or a plurality of magnets joined to the axle. In the illustrated examples of embodiments, the second magnet is a cradle magnet 133, or includes a cradle shape.

The second impeller magnet 177 is provided with a polarity (e.g., a magnet having two opposite poles). The second impeller magnet 177 in position in the measurement unit 170 is placed in proximity to, joined to, or in communication with a Hall effect sensor 153. The Hall effect sensor 153 is capable of detection of a change in polarity. Accordingly, the Hall effect sensor 153 is positioned relative to the second impeller magnet 177 such that the sensor detects the change in polarity caused by the movement or rotation of the second impeller magnet 177. As described herein, the Hall effect sensor 153, in one or more examples of embodiments, is carried by or joined to the cover 121. However, alternative locations may also be acceptable for the purposes of the present invention.

The measurement unit 170 and water chamber 125 are joined to an energy unit 150. In one or more examples of embodiments, the measurement unit 170 and water chamber 125 are joined in a water tight manner so as to reduce the likelihood of water leaking into the energy unit 150.

The energy unit 150 has a chamber including the alternator motor. As shown in one or more illustrated examples, the energy unit 150 and/or the electronics unit 130 may comprise a electric unit cage 132 and cover 131. The cage 132 may surround an alternator motor and carry one or more elements of the energy unit 150 and/or electronics unit 130, such as the battery and or electronic components further described herein. The alternator motor may be a small motor available from common commercial sources and is capable of generating voltage and current. In one or more further examples of embodiments, the energy unit 150 may include a smaller generator in place of the illustrated alternator motor. The energy unit 150 may have a shaft or axle 138 of the alternator which extends from the chamber and into communication with the measurement unit 170 or water chamber 125 as described above.

The energy unit 150 is joined to an electronic unit. The electronic unit includes a circuit for recharging of the smart water management fixture device and a corresponding rechargeable battery or plurality of batteries. The circuit for recharging the fixture device or recharging module couples and converts the energy generated by the alternator motor into energy stored by the rechargeable battery. To this end, the alternator motor is electrically coupled to the circuit for recharging or recharging module. Likewise, an energy storage device, such as a rechargeable battery, which may be positioned in or near the energy unit 150, is electrically coupled to the circuit for recharging. The rechargeable battery may be any now known or future developed suitable rechargeable battery. Preferably, the battery has a compact size such that it may be housed within the smart water management fixture device, and has a lifecycle extending for an extended period of time, although variations thereon may be acceptable for the purposes provided. An example battery suitable for the intended purposes is a Li-ION battery.

The electronics unit 130 also includes a circuit for wireless communication, or a wireless communication module.

The wireless communication module is responsible for user communications. In one or more particular embodiments, the wireless communication module or unit is capable of Wi-Fi communication. In alternative examples of embodiments, the wireless communication unit may be capable of Bluetooth communication, GPRS communication, 802.15.4 communication implementation, or combinations of any one or all of the foregoing. In one or more examples of embodiments, the communication device is a low energy wireless device to device communication vehicle. The wireless communication module or circuit is in electrical communication with the sensors described herein. For example, the wireless communication circuit may be in communication with the temperature sensor and/or Hall effect sensor 153, velocity sensor or other sensors coupled to the unit.

In one or more alternative examples of embodiments, the system may be provided with a device for harvesting energy from the wireless signal, or Wi-Fi signal, and may in one or more such examples be provided without a battery or with a small battery (and in some instances small generator).

The electronics unit 130 may include an embedded circuit to calculate all of the sensed data. This data may be made available to the user via an alert module to provide feedback, such as in the form of light, sound, or communication to a linked computing or software application.

Accordingly, the electronics unit 130 may also have an alert module. The alert module may have a sound generating device for producing an audio alert or alarm. The alert module may also have or alternatively have a light source for producing a visual alert. In one or more examples of embodiments, the visual alert may further include a continuous light (or blinking light) of one or more colors. For example, a light which changes from green, to yellow, to red may provide a means for communication. The alert module may be electrically coupled to the wireless communication circuit, as well as or alternatively to one or more of the sensors described herein.

The various components of the devices described in further detail herein may be formed of commercially available materials and components suitable for the purposes provided. For example, the housing 120 or water chamber 125 as well as other components of the smart water management fixture device may be formed of or include water proof materials. The housing 120 may be formed of durable rigid materials, such as plastic or metal or, for example PVC material, as commonly used in plumbing systems. One or more seals or sealing materials may further be provided in association with the housing 120. As one illustrative example, a resilient O-ring may be provided at the connection of two components. Likewise, the impeller may be formed of a durable, rigid material such as a plastic or metal. In this regard, the devices may be formed by mold, extrusion, cast, or for example CNC machining. In the alternative, one or more devices described herein may be formed by 3-D printing. The components may be formed of a single unit, or alternatively formed of multiple units joined together by suitable means such as adhesive or fasteners or thermoforming. The magnets described herein may be any suitable magnet for accomplishing the purposes provided and may be adhesively attached or attached by other means such as friction fit or tongue and groove and the like. Likewise, the various electronic unit components may be obtained from commercially available sources.

The system described herein, and in particular, the electronic unit may obtain data produced or received by one or more sensors. For example, data from the Hall effect sensor 153 and/or data from the thermistor 154 is transmitted to the electronic unit and subsequently sent to a remote storage medium. It is also contemplated that the electronic unit may include a memory or local storage medium for storage of data. In one or more examples of embodiments, the data is transmitted to a cloud storage unit. As indicated herein, communication by the system is via wireless means. Accordingly, a wireless communication may be sent by the wireless communication module to the cloud storage device.

The data may be retrieved from the storage system by one or more applications or software applications. The data may also be further processed or communicated to or via the applications. In one example of embodiments, the application is a mobile application such as may be available on a smartphone, or tablet computer. The application may also be an application on a laptop, desktop, or other computing device or system. In one or more further examples of embodiments, the application may be a web application. In alternative examples of embodiments, the application is embodied in an API. In one or more examples of embodiments, the application or API provides or is formed of user configurable software permitting the user to customize the data to receive, display, and store. In this regard, different interests may drive different screens and controls used or displayed by the software.

The software and linked computing system provides a mechanism for control of the smart water management fixture device and/or one or more of its components. The software and linked computing system can also establish or set limits for the monitored aspects of the water. An example flow chart of screen shots of a user interface 1020 from a representative mobile application 1010 is shown in FIGS. 32-36. As can be seen, a user interface with security settings such as a username and password may be provided. The user is then provided with a number of options, including options for display of data, setting of alerts, communications, linking of other systems, and, in one or more examples, social media connections. The display of data provides various forms and amounts of data or information for a user. In the illustrated example, a user is provided with a real time water consumption value, as well as metrics reflecting goals and historical usage. Multiple system devices can be monitored and combined with the software application, and can be further isolated for review and evaluation. Additional details may also be used and added to the software through one or more fields or entry points, permitting filtering or further characterization of the data obtained by the system. It is understood that the forgoing is provided for purposes of example only, and variations thereon are acceptable. For example, the application may be an API, which provides the user the ability to customize the particular software system for the purposes or uses of the particular facility.

As indicated, the methods, systems, and devices described herein may be implemented in or by software. To this end, the methods, systems, and devices may be implemented in a general purpose software package. In one or more examples of embodiments the method, system, or device, or such method, system, or device embodied by software, may be implemented by a computer system or in combination with a computer system. The computer system may be or include a processor. The computers for use with the methods and various components described herein may be programmable computers which may be special purpose computers or general purpose computers that execute the system according to the relevant instructions. The computer system can be an embedded system, a personal computer, notebook computer, tablet computer, server computer, mainframe, networked computer, handheld computer, personal digital assistant, workstation, and the like. Other computer system configurations may also be acceptable including, cell phones, mobile devices, multiprocessor systems, microprocessor-based or programmable electronics, network PC's, minicomputers, and the like. Preferably, the computing system chosen includes a processor suitable in size to efficiently operate one or more of the various systems, devices, or functions.

As seen in the figures, a user interface 1020 can provide information regarding grouping of devices 1021, information about a selected group 1022, and information for individual devices within the group 1023. A drill-down interface 1031 may be provided for water consumption, such as water volume for a device for a selected time. Further, an information interface 1032 can be provided for each device with information such as battery status, last sync date, signal strength.

The system or portions thereof as described herein are linked to a distributed computing environment, where tasks are performed by remote processing devices that are linked through a communications network. To this end, the system may be configured or linked to multiple computers in a network, including, but not limited to a local area network, a wide area network, a wireless network, and the Internet. Accordingly, information and data is transferred within the network or system by wireless means. Such wireless means include any now known or future developed system, examples of which include Wi-Fi, Bluetooth, GPRS, RF, and cellular data systems. It is also contemplated that certain aspects of the system may be implemented through hardwire connection, such as computer to computer communication.

The computer can also include a display, provision for data input and output, etc. Furthermore, the computer or computers may be operatively or functionally connected to one or more mass storage devices, such as, but not limited to a database or cloud storage medium. The memory storage can be volatile or non-volatile and can include removable storage media. The system may also include computer-readable media which may include any computer readable media or medium that may be used to carry or store desired program code that may be accessed by a computer. The invention can also be embodied as computer readable code on a computer readable medium. To this end, the computer readable medium may be any data storage device that can store data which can be thereafter read by a computer system. Examples of computer readable medium include read-only memory, random-access memory, CD-ROM, CD-R, CD-RW, magnetic tapes, and other optical data storage devices. The computer readable medium can also be distributed over a network coupled computer system so that the computer readable code is stored and executed in a distributed fashion.

These devices may include a graphical user interface (GUI) or a communication means by which commands may be entered and content may be displayed or communicated. For example, the computer may include a user interface that allows navigation of objects. The computer may implement or include an application that enables a user to display and interact with text, images, videos, data, and other information and content.

Aspects of the method, system, and devices described herein can be implemented on software running on a computer system. The system or method herein, therefore, may be operated by computer-executable instructions, such as but not limited to program modules, executable on a computer. Examples of program modules include, but are not limited to, routines, programs, objects, components, data structures and the like which perform particular tasks or implement particular instructions. The software system may also be operable for supporting the transfer of information within a network.

One or more examples of use of the smart water management system will now be described. In use, the smart water management system fixture device 100 is joined or attached to a fixture or plumbing of a water line. The fixture device is attached such that water flows into the fixture device through the inlet fitting 111 and out the outlet fitting 112. Water is flowed into and through the water chamber 125 of the fixture device. As water flows through the water chamber 125, it passes over the impeller 171. As a result of the flow of water, the impeller 171 is caused to rotate. Rotation of the impeller 171 increases with a higher flow rate and decreases with a lower flow rate. The velocity of each rotation is measured by detecting the resulting signal frequency which results by means of the Faraday principle resulting of rotating the magnet attached to the impeller 171 with a coil 133 exterior to the fluid flow path 13. More specifically, the rotation of the impeller 171 causes the magnet to move. This movement induces an alternating current (AC) in the coil 133. This signal's frequency is measured and registered in the device computer.

Flow may be calculated by any number of means and may be based on, for example, the number of rotations, the volume of the chamber, and speed of rotation, among other factors. In one embodiment, the amount of water used for a period of time is determined from the number of rotations of the impeller 171 and the volume of water of the water chamber 125 (such as the volume of water that one rotation of the impeller 171 will pass through the water chamber 125) associated with each rotation of the impeller 171. The temperature of the water may also be sensed and/or monitored by a thermal sensor, such as a thermistor 154. Likewise, water quality may also be detected or sensed. The data collected by the sensors is transmitted to the electronics unit 130 of the fixture device via wired connection. Wireless communication may also be used. Such usage can be monitored and controlled in real time. Data can also be stored. In this regard, data may be stored locally or transmitted via the attached wireless communication module to the linked computing system and application. The computing system and application provide data display and other user configured information to the user, as well as the ability to control one or more aspects of water consumption. For example, a user can consult consumption reports and data statistics for various time periods, as well as comparing such results to goals and friends or other systems. Data from third party sources can also be accessed, uploaded, or otherwise input into the system as data and used by the smart water management system for various purposes. Monthly savings can also be calculated and forecast. Moreover, a user can set goals and alarms, request and receive advice, and share via social networks.

In one embodiment, a plurality of smart water management system fixture devices 100 can be grouped. For example, a smart water management system fixture device 100 may be associated with each of a plurality of water fixtures in a home, such as a first shower and a second shower. The user interface may provide The current and voltage generated in the coil 133 is then applied to an energy harvesting module which uses then amplifies the voltage and uses it to charge an external storage device, such as a super capacitor. This charge is then transmitted by wired connection to a rechargeable battery via the rechargeable energy circuit. As a result, the smart water management system both recharges itself and monitors aspects of the water flowing through the system simultaneously.

The smart water management system described herein tracks water consumption volumes and triggers or encourages actions. The mechanisms used by the fixture device provide precision measurement of the characteristics of the water (e.g., flow, volume, quality, temperature). In this way, the system helps users monitor and control the amount of water used so action can be taken to correct usage. Such usage can be monitored and controlled in real time. In addition, data can be collected and stored on usage and other water properties, such as temperature and/or quality. As a result, users can obtain additional information about water and water use, permitting the users to make educated decisions on how to effectively manage such usage, ultimately leading to cost savings for the user and environmental benefits associated with reduced water consumption and corresponding waste. The smart water system described herein has additional advantages in that it can be small in size and versatile in that it can be scaled for residential or commercial use. The system, and in particular the fixture device described herein, further powers itself, therefore creating a self-sustaining system. Accordingly, the smart water management system described herein is easy to use, versatile, and achieves cost savings for the user, thereby increasing the competitive advantage of the user, particularly in the instance of commercial use. The smart water management system further provides environmental advantages by reducing risks associated with water scarcity.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

Moreover, some portions of the detailed descriptions herein are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities. Unless specifically stated otherwise as apparent from the discussions herein, it is appreciated that throughout the present invention, discussions utilizing terms such as "receiving," "sending," "generating," "reading," "invoking," "selecting," and the like, refer to the action and processes of a computer system, or similar electronic computing device, including an embedded system, that manipulates and transforms data represented as physical (electronic) quantities within the computer system.

Figure 37:
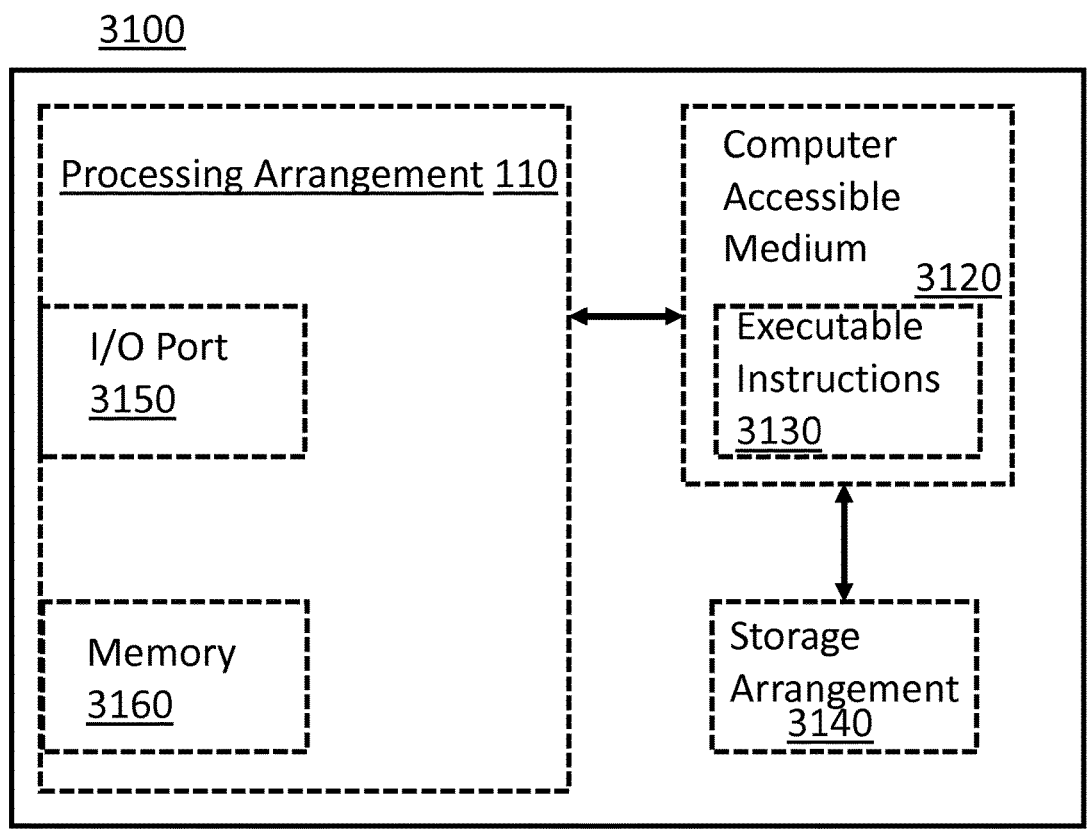
FIG. 37 illustrates a computer system for use with certain implementations.

As shown in FIG. 37, e.g., a computer-accessible medium 3120 (e.g., as described herein, a storage device such as a hard disk, floppy disk, memory stick, CD-ROM, RAM, ROM, etc., or a collection thereof) can be provided (e.g., in communication with the processing arrangement 3110). The computer-accessible medium 3120 may be a non-transitory computer-accessible medium. The computer-accessible medium 3120 can contain executable instructions 3130 thereon. In addition or alternatively, a storage arrangement 3140 can be provided separately from the computer-accessible medium 3120, which can provide the instructions to the processing arrangement 3110 so as to configure the processing arrangement to execute certain exemplary procedures, processes and methods, as described herein, for example. The instructions may include a plurality of sets of instructions. For example, in some implementations, the instructions may include instructions for applying radio frequency energy in a plurality of sequence blocks to a volume, where each of the sequence blocks includes at least a first stage. The instructions may further include instructions for repeating the first stage successively until magnetization at a beginning of each of the sequence blocks is stable, instructions for concatenating a plurality of imaging segments, which correspond to the plurality of sequence blocks, into a single continuous imaging segment, and instructions for encoding at least one relaxation parameter into the single continuous imaging segment.

System 3000 may also include a display or output device, an input device such as a key-board, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

What is claimed is:

1. A smart water management system comprising:
   a housing associated with a turbine system and an electronics unit, the housing further comprising a housing inlet and a housing outlet configured to engage with a water line and a coil disposed between the housing inlet and the housing outlet;
   a water chamber disposed in the housing between the housing inlet and the housing outlet, the housing inlet, water chamber, an axle, and the housing outlet defining a linear water passageway, the axle extending perpendicular to the longitudinal axis of the linear water passageway and the coil exterior to the linear water passageway;
   the turbine system comprising an impeller disposed entirely within the water chamber, the impeller rotatable within the water chamber about the axle;
   a magnet substantially surrounding an end of the axle adjacent to the coil; and
   an electronics module in communication with the turbine system and including a wireless communication unit disposed in the housing, the wireless communication unit in communication with one or more sensors;
   wherein the impeller is rotatable about an impeller rotation axis perpendicular to the longitudinal axis of the water passageway.

2. The system of claim 1, further comprising an energy chamber housing an alternator in electrical communication with the turbine system and an energy storage device.

3. The system of claim 1, wherein the water passageway is substantially linear.

4. The system of claim 1, wherein the housing includes a removable cap.

5. The system of claim 4, wherein the removable cap has one or more sensors attached thereto and disposable within the water chamber when the removable cap is affixed to the housing.

6. The system of claim 1, wherein the coil is disposed on a removable cap.

7. The system of claim 1, further comprising an alert module associated with the housing and in communication with the electronics unit.

8. A computer-implemented system for managing water consumption comprising:
   a smart water management system fixture device comprising:
      a housing associated with a turbine system and an electronics unit, the housing further comprising a housing inlet and a housing outlet configured to engage with a water line and a coil disposed between the housing inlet and the housing outlet;
      a water chamber disposed in the housing between the housing inlet and the housing outlet, the housing inlet, water chamber, an axle, and the housing outlet defining a linear water passageway the axle extending perpendicular to the longitudinal axis of the linear water passageway and the coil exterior to the linear water passageway;

the turbine system comprising an impeller disposed on the axle within the water chamber, the impeller rotatable within the water chamber about the axle;

a magnet substantially surrounding an end of the axle adjacent to the coil;

an electronics module in communication with the turbine system and including a wireless communication unit disposed in the housing, the wireless communication unit in communication with the one or more sensors and in communication with a remote device; and the remote device having a processor and a tangible computer-readable medium operatively connected to the processor and including computer code configured to:

determine a rate of flow through the turbine of the smart water management system fixture device; and calculate the volume of water passing through the smart water management system fixture device based upon the rate of flow and an elapsed time;

display information on a graphical user interface regarding water consumption based upon the calculated volume;

wherein the impeller is rotatable about an impeller rotation axis perpendicular to the longitudinal axis of the water passageway.

9. The computer-implemented system of claim 8, wherein the smart water management system fixture device further comprises a temperature sensor and the computer code is further configured to display water temperature.

10. The computer-implemented system of claim 8, wherein the smart water management system fixture device further comprises a water quality sensor and the computer code is further configured to display water quality information.

11. The computer-implemented system of claim 8, wherein the computer code is further configured to display a report regarding the flow of water.

12. A smart water management system comprising:

a housing associated with a turbine system and an electronics unit, the housing further comprising a housing inlet and a housing outlet configured to engage with a water line and a coil disposed between the housing inlet and the housing outlet;

a water chamber disposed in the housing between the housing inlet and the housing outlet, the housing inlet, water chamber, an axle and the housing outlet defining a water passageway, the axle extending perpendicular to the longitudinal axis of the water passageway and the coil exterior to the linear water passageway;

an energy chamber housing an alternator in electrical communication with the turbine system and an energy storage device;

the turbine system comprising an impeller disposed on the axle within the water chamber, the impeller rotatable within the water chamber about the axle;

a magnet substantially surrounding an end of the axle adjacent to the coil; and an electronics module, external to the water passageway, in communication with the turbine system including an energy unit and including a wireless communication unit disposed in the housing, the wireless communication unit in communication with one or more sensors.

* * * * *